May 20, 1969    J. A. ARMSTRONG    3,445,668
ULTRAFAST OPTICAL COINCIDENCE DETECTOR WHICH UTILIZES THE
(1, -1, 0) SURFACE OR ITS CRYSTALLOGRAPHIC EQUIVALENT IN
CRYSTALS OF THE $\bar{4}2m$ OR $\bar{4}3m$ CLASS FOR MIXING TWO
ORTHOGONALLY POLARIZED PULSES
Filed May 4, 1967

INVENTOR
JOHN A. ARMSTRONG
BY
ATTORNEY

United States Patent Office 3,445,668
Patented May 20, 1969

3,445,668
ULTRAFAST OPTICAL COINCIDENCE DETECTOR WHICH UTILIZES THE (1, −1, 0) SURFACE OR ITS CRYSTALLOGRAPHIC EQUIVALENT IN CRYSTALS OF THE $\bar{4}2m$ OR $\bar{4}3m$ CLASS FOR MIXING TWO ORTHOGONALLY POLARIZED PULSES
John A. Armstrong, South Salem, N.Y., assignor to International Business Machines Corporation, Armonk, N.Y., a corporation of New York
Filed May 4, 1967, Ser. No. 636,105
Int. Cl. H01j 39/12; G02f 1/28
U.S. Cl. 250—217                    6 Claims

ABSTRACT OF THE DISCLOSURE

An optical pulse coincidence detector whose coincidence resolving time is faster than $10^{-12}$ seconds. The detector utilizes the optical sum-frequency (of two coincident pulses) generated in reflection at the surface of a single crystal of GaAs, which optical sum-frequency is generated only when the two coincident pulses are orthogonally polarized. The optical sum-frequency is a particular color and the detector can be made sensitive to this color.

Background of the invention

Methods for mode-locking lasers employing Nd-doped glass or Nd-doped yttrium-aluminum-garnet as active media in lasers have been achieved, and such lasers are described in articles appearing in the 1966 issue of "Applied Physics Letters" 8, page 174+ and page 180+. Such mode locking results in the production of extremely short pulses, i.e., of the order of $10^{-12}$ seconds in duration. Measuring and detecting equipment for such ultrashort pulses are not available, resulting in an inability to determine some of the basic characteristics of such pulses.

The present invention provides an optical pulse coincidence detector as a means for sensing ultrashort optical pulses. In a coincidence detector an output pulse is produced only if two inputs arrive simultaneously at the detecting unit. The detector employs the special symmetry properties of optical sum-frequency generation in reflection at the surface of a GaAs single crystal. Although GaAs is very nonlinear optically, there are a number of orientations of the polarization of an incident light pulse such that no harmonic or sum-frequency light will be generated. However, if two pulses whose coincidence is to be detected have suitable orthogonal polarizations, there will be efficient sum-frequency generation at the crystal surface.

The above mentioned effect can be employed to measure the widths and shapes of such ultrashort pulses. To accomplish such measurement, the fast pulse train emanating from a mode locked laser is divided into two beams. One of the two beams is passed through a z-cut quartz element and its polarization is rotated 90°, making such beam be polarized perpendicular to the plane of incidence. The beam whose polarization has been rotated 90° is made to pass through a fixed, totally reflective prism which directs it back to a mirror and a second beam splitter. At this second beam splitter, it is recombined with the beam whose polarization has been undisturbed, the latter beam having traversed a path whose length can be varied by moving a second prism. The useful output of this part of the apparatus will comprise two superposed, parallel beams of orthogonally polarized pulses having an adjustable delay between them, the adjustable delay being provided by the movable prism. The average width of the pulses in the train is measured by measuring the amount of movement of the movable prism needed to destroy the coincident arrival of the two pulses at the crystal surface.

Consequently it is an object of this invention to provide a novel coincidence detector.

Yet another object is to provide a detector circuit capable of detecting optical pulses as short as $10^{-13}$ seconds or shorter.

A further object is to employ such novel detector in a system for measuring extremely narrow optical pulse widths.

Yet another objec is to attain an accurate measurer of picosecond laser pulse widths employing relatively few components.

The foregoing and other objects, features and advantages of the invention will be apparent from the following more particular description of preferred embodiments of the invention, as illustrated in the accompanying drawings.

Description of the preferred embodiments

Figure 1:
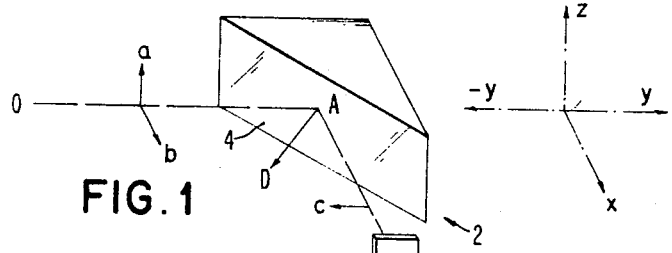
FIG. 1 is a schematic representation of the novel coincidence detector.

The detector 2 of FIG. 1 comprises a single crystal of GaAs cut so that any incident light to be detected will fall on the (1, −1, 0) plane. $\overline{OA}$ is the direction of incidence of the pulses whose coincidence is to be detected. Assume that a first pulse $p1$ is polarized in the direction shown by the vector $a$ and the second pulse $p2$ is polarized in the direction shown by the vector $b$, the two vectors being at right angles to each other. The GaAs crystal is very nonlinear optically and there are a number of orientations of the polarization of an incident light pulse (including directions $a$ or $b$ above) for which no harmonic or sum-frequency light will be generated. However, when two coincident pulses are orthogonally polarized, there is highly efficient sum-frequency generation at the crystal surface 4 during the overlap of such orthogonally polarized pulses.

The sum-frequency is generated only along the direction $\overline{AB}$, where $<DAB=<OAD$, and $\overline{AD}$ is the normal to crystal surface 4. The sum-frequency beam is polarized in the direction along the vector $c$. A detector 6, such as a photomultiplier, is placed in the path that intercepts sum-frequency beam $\overline{AB}$. As an additional aid in obtaining selectivity in detection, a filter 8 is employed between crystal surface 4 and photomultiplier 6 to transmit only the sum-frequency light to photomultiplier 6, attenuating any reflected laser light from surface 4.

Although the coincidence detector has been shown to be a GaAs crystal having a detecting surface lying in the (1, −1, 0) plane and the [001] crystal direction is normal to the plane of incidence of the light to be detected, the invention can be generalized in several ways. Any crystal having the same symmetry as GaAs, namely, $\bar{4}3m$, or any crystal of the symmetry of potassium dihydrogen phosphate (KDP), namely, $\bar{4}2m$, could be used in place of and in the same configuration as GaAs shown in FIG. 1. A more detailed description of classes $\bar{4}2m$ and $\bar{4}3m$ is found in a book entitled "Introduction to Solid State Physics"—Kittel, page 17+, published by Wiley & Sons, 2nd edition, 1956, New York, that sets out a short form of the International Symbols for the Crystallographic Point Groups for identifying the symmetry class of crystals.

The invention also embraces the modification that includes rotating the crystal of FIG. 1 by 90° around the normal $\overline{AD}$ to surface 4. Accompanying this rotation, the polarizer 8 is also rotated 90° so that the latter will transmit sum-frequency light polarized perpendicular to the plane of incidence. Moreover, it is well within the contemplation of this invention that the sum-frequency to be detected need not be restricted to the second harmonic of a given incident frequency. The two pulses whose coincidence is to be detected can be two pulses of different frequencies, i.e., $\omega_1$ and $\omega_2$, but orthogonally polarized as discussed hereinabove. The detector 6 of FIG. 1 is then made sensitive to the sum-frequency $\omega_1+\omega_2$ rather than the harmonic frequency of the example given to illustrate the invention.

The following equations represent components ($P_x$, $P_y$, $P_z$) of the sum-frequency dielectric polarization produced in the crystal by the incident optical pulses $\vec{E}(\omega_1)$ and $\vec{E}(\omega_2)$. The axes $x$, $y$, $z$ are chosen to correspond to the $x$, $y$, $z$ axes of the crystal $$P_x(\omega_3) = \chi[E_y(\omega_1)E_z(\omega_2) + E_z(\omega_1)E_y(\omega_2)] \quad (1)$$
$$P_y(\omega_3) = \chi[E_x(\omega_1)E_z(\omega_2) + E_z(\omega_1)E_x(\omega_2)] \quad (2)$$
$$P_z(\omega_3) = \chi[E_x(\omega_1)E_y(\omega_2) + E_y(\omega_1)E_x(\omega_2)] \quad (3)$$

where $\omega_3 = \omega_1 + \omega_2$ and $\omega_1$ is the frequency of a first polarized laser beam and $\omega_2$ is the frequency of a second polarized laser beam. $P_x$ is the $x$ component of the sum-frequency dielectric polarization; $P_y$ and $P_z$ represent the $x$ and $y$ components of the sum-frequency polarization respectively; $\chi$ equals the nonlinear susceptibility of a medium; E represents an electric field and $E_x$, $E_y$ and $E_z$ are respectively the $x$, $y$ and $z$ components of such electric field.

The operation of the coincidence detector will be described in terms of the above equations. In FIG. 1, let the incident pulse $p1$, polarized along $a$, be at frequency $\omega_1$, and pulse $p2$, polarized along $b$, be at frequency $\omega_2$. As can be seen from the coordinate system of FIG. 1, the electric field $E(\omega_1)$ is polarized along the $z$ axis, i.e., $E_x(\omega_1) = E_y(\omega_1) = 0$. On the other hand, pulse $p2$, when refracted into the crystal, will have no component along the $z$ axis, i.e., $E_z(\omega_2) = 0$. However, $E_x(\omega_2)$ and $E_y(\omega_2)$ are $\neq 0$. The nonlinear polarization $P(\omega_3)$ can now be evaluated explicitly using Equations 1, 2 and 2.

Assume, first, pulses $p1$ and $p2$ do not overlap during their arrival at the detector. Then it is seen from such equations (each term to the right of equal sign involves the product of simultaneous fields at the two frequencies) that all components of $P(\omega_3)$ will vanish and there will be no sum-frequency light generated at the surface 4 of the crystal. Assume alternatively that pulses $p1$ and $p2$ overlap at their arrival at crystal surface 4, i.e., there will be simultaneous non-zero fields at $\omega_1$ and $\omega_2$. Thus Equation 1 becomes $$P_x(\omega_3) = \chi[0 \times 0 + E_z(\omega_1)E_y(\omega_2)]$$

Equation 2 becomes $P_y(\omega_3) = \chi[0 \times 0 + E_z(\omega_1)E_x(\omega_2)]$ and Equation 3 becomes $$P_z(\omega_3) = \chi[0 \times E_y(\omega_2) + 0 \times E_x(\omega_2)] = 0$$

Since $P_z = 0$, and $P_x$ and $P_y$ are $\neq 0$, a sum-frequency signal will be radiated in the plane of incidence.

In the case where the frequencies $\omega_1$, $\omega_2$ are equal (harmonic generation instead of sum-frequency generation), Equations 1–3 can be analyzed in an analogous manner, and it will be seen that a harmonic signal polarized parallel to the plane of incidence can be produced only if pulses $p1$ and $p2$ overlap in time at surface 4.

Figure 2:
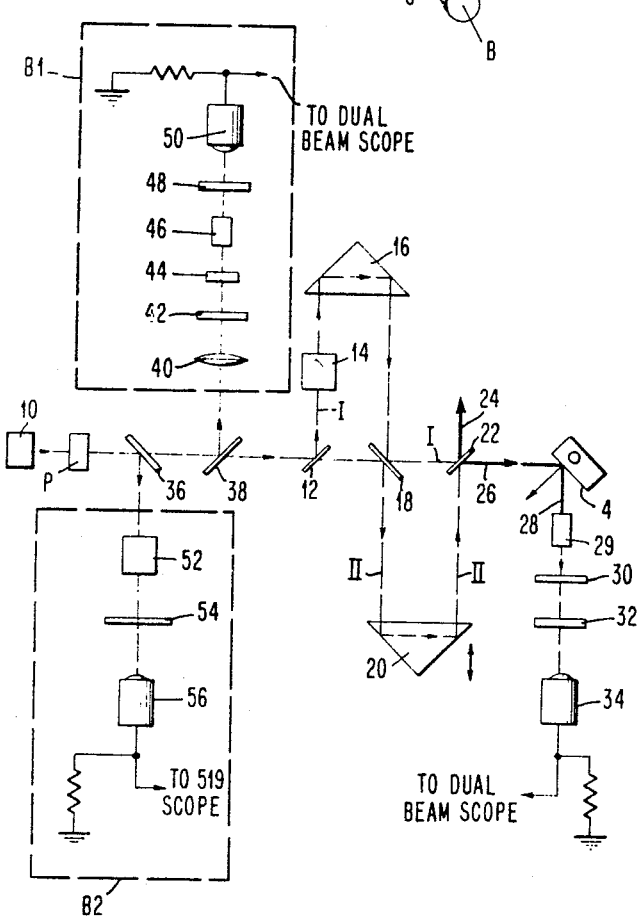
FIG. 2 is a schematic representation of the use of such coincidence detector in a system for measuring pulse widths of the order of $10^{-13}$ seconds.

FIG. 2 is employs the detector of FIG. 1 to measure pulses that are of the order of picoseconds in width. A mode-locked laser 10 emits a train of short pulses whose average width is to be measured. The train is polarized parallel to the plane of the drawing by polarizer P, before being split into two beams I and II by beam splitter 12. Beam I is passed through an optically active z-cut quartz crystal 14 which rotates its plane of polarization 90°, making such beam I perpendicular to the plane of the figure and to the plane of incidence at the GaAs surface 4. Such beam I passes through a fixed, totally reflecting prism 16 which directs the beam back to a two-sided mirror 18. Beam II traverses the beam splitter 12 and is reflected by mirror 18 to a movable prism 20. The two beams I and II are merged at another beam splitter 22, 24 representing the discarded beams and 26 being the merged portions that impinge on the surface 4 of the crystal.

The two beams I and II fall on the surface 4 of single crystal of GaAs, the latter generating second harmonic light 28. In a particular type of mode-locked laser, whose active medium was neodymium-doped glass, the emitted laser pulses had a wavelength of $1.06\mu$. Consequently, the second harmonic wavelength of beam 28 is $0.53\mu$. A filter 30 preferentially allows the passage of light having a wavelength of $0.53\mu$ and the polarizer 32 and photomultiplier 34 complete the detection scheme so that only second-harmonic light polarized parallel to the plane of incidence is recorded. Attenuator 29, composed of an aqueous solution of $CuSO_4$, is used to attenuate the laser beam to prevent damage of photomultiplier 34.

The GaAs crystal is oriented so that the [1$\bar{1}$0] direction is normal to its surface, and the [001] direction, which is perpendicular to the plane of incidence, is parallel to the polarization of beam I. From the symmetry of the nonlinear susceptibility tensor for GaAs, well known to those skilled in the art of nonlinear optics, it follows that with the above noted orientation of the crystal surface 4, neither of the linearly polarized beams at $1.06\mu$, acting alone, will generate second harmonics of the required polarization. However, when the two beams I and II overlap during their arrival at the crystal surface 4, the resultant total laser field during the overlap has $x$, $y$, and $z$ components and produces a second-harmonic reflected beam with a large component of parallel polarization.

Figure 3:
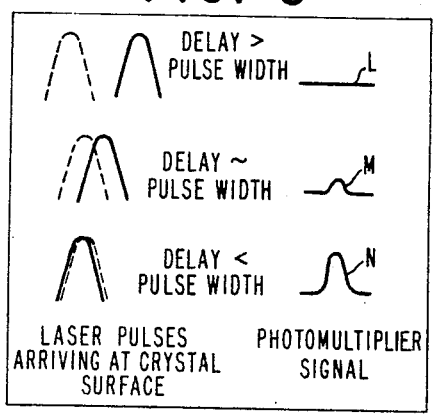
FIG. 3 is a showing of harmonic light generated by GaAs as a function of the delay between the laser pulses.

The amount of harmonic signal produced depends on the degree of overlap of the pulses I and II. For example, in FIG. 3, two orthogonally polarized beams are separated by more than a pulse width so that there is no overlap and hence no harmonic light generated at the surface 4 of the GaAs crystal; this is shown as the horizontal line L. By moving prism 20 closer to mirror 18, a smaller delay between pulses is produced and the pulses overlap, producing an output M at the photomultiplier 34. Where the prism 20 is moved so that the delay between the arrival of the two beams at crystal surface 4 is much less than the width of the pulses, a maximum output N is produced by photomultiplier 34.

Figure 4:
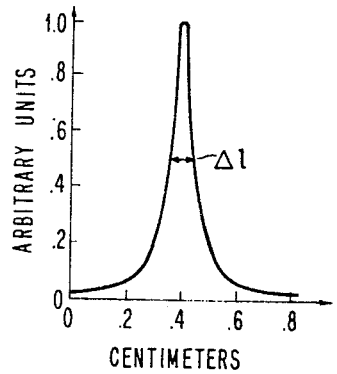
FIGURE 4 is a plot of harmonic signal output from the detector as a function of position of the movable prism.

The delay between beams can be varied by movable prism 20 in intervals as small as $10^{-13}$ sec. In FIG. 4, the normalized harmonic signal from crystal surface 4 is plotted against the position of the movable prism 20.

The duration of the pulses under study by my detector is calculated from an experimental curve such as that shown in FIG. 4 by the following formula:

$$\Delta t = 2 \Delta l / BC \quad (4)$$

where $\Delta t$ is the full width in seconds at half-maximum intensity of a typical pulse, $\Delta l$ is the full width at half-maximum intensity in centimeters of the experimental result shown in FIG. 4, C is the velocity of light in cm./sec., and B is a numerical factor dependent on the shape of the fast pulse under study and varies from 2 to $\sqrt{2}$. For data relied on to plot FIG. 4, $\Delta l = 0.13$ cm., $B = 2$, and $C = 3 \times 10^{10}$ cm./sec., $\Delta t = 4 \times 10^{-12}$ cm. The factor 2 in the Formula 4 reflects the fact that the delay introduced in the path of light beam II by movable prism 20 increases twice as fast as the change in the position of the prism.

In an actual experimental setup shown in FIG. 2, two other detectors are shown in dotted boxes B1 and B2. A portion of the original pulse train, after passing through polarizer P, is diverted into detector B2 by beam splitter 36 and another portion is directed by beam splitter 38 into detector B1, consisting of lens 40, filter 42, z-cut quartz crystal 44, attenuator 46, filter 48 and photomultiplier 50. The second harmonic signal generated by the z-cut quartz crystal 44 is used to normalize the harmonic signal generated by GaAs crystal. Such normalization is a standard procedure in harmonic generation with pulsed lasers to protect the experimenter from changes in characteristics of the mode-locked laser source. The fast pulses of the mode-locked laser are also monitored by attenuator 52, filter 54 and photocell 56, the output of which goes to a Tektronix 519 oscilloscope, not shown. The purpose of the monitoring scope 519 is to allow one to reject data obtained by photomultiplier 34 when such scope 519 has indicated that the original laser source has produced a pulse train that is significantly different from a standard useful pulse train.

The coincidence detector of the present invention is particularly advantageous in that it can detect pulses of the order of $10^{-12}$ or $10^{-13}$ sec. duration; the output energy of such detector for coincidence is 100 times greater than when pulses being detected are not in coincidence. Consequently, discrimination between wanted and unwanted signals is extremely high. Furthermore, a 0.001 inch movement of the prism 20 results in a 0.002 inch increase in path length for beam II, and such 0.002 inch increase in path length corresponds to a time interval of about $2 \times 10^{-13}$ sec. (the amount of time light takes to travel 0.002 inch). The results of a series of such measurements give the pulse width and shape as shown in FIG. 2b, such plot indicating a pulse width of the order of $4 \times 10^{-12}$ sec. Obviously accurate measurement of such narrow pulse widths is of great aid not only in the study of laser characteristics, per se, but in the field of nonlinear optics generally.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A coincidence detector comprising a crystal of the $\bar{4}2m$ or $\bar{4}3m$ class, said crystal being cut along a (1, −1, 0) surface or its crystallographic equivalent to present a surface to radiation to be detected, such surface being oriented so that the [001] type direction lying in that surface is either perpendicular to or paralle to the plane of incidence of said radiation on said surface,
    means for transmitting two radiation pulses that are orthogonally polarized with respect to each other and are either perpendicular or parallel to the plane of incidence,
    said pulses impinging on said surface whereby the latter generates a sum-frequency radiation that is polarized in a direction parallel to a perpendicular plane of incidence, said generation occurring only if said pulses are coincident at said surface, and
    radiation detector means in the path of said sum-frequency radiation.

2. A coincidence detector comprising a crystal of GaAs, the latter being cut to form a surface lying in the (1, −1, 0) plane or its crystallographic equivalent,
    two simultaneous orthogonally polarized pulses impinging on said surface, said polarizations being either perpendicular or parallel to the plane of incidence of said pulses,
    the impingement of such orthogonally polarized pulses producing a sum-frequency radiation output whose plane of polarization is parallel to the plane of incidence, and
    means for detecting such sum-frequency radiation.

3. The detector of claim 2 wherein a filter, transparent only to said sum-frequency radiation, is interposed between said GaAs crystal and said sum-frequency radiation detecting means.

4. The detector of claim 2 wherein said orthogonally polarized beams are laser beams.

5. A system for measuring ultrashort laser pulse widths comprising a single crystal of GaAs cut so as to provide a surface in the (1, −1, 0) plane or its crystallographic equivalent,
    means for dividing each pulse into two pulses, the first of said two pulses being polarized orthogonally to the second of said two pulses,
    means for varying the length of the path of the second pulse with respect to said first pulse so as to provide an adjustable delay between said two pulses,
    means for merging said two pulses,
    means for impinging said orthogonally polarized pulses onto said crystal plane so as to create a sum-frequency radiation generation of said two pulses at said surface, only when such pulses are in coincidence, and
    means for detecting said sum-frequency radiation.

6. A system for measuring ultrashort laser pulse widths comprising a single crystal of the $\bar{4}2m$ or $\bar{4}3m$ class cut so as to provide a surface for generating harmonic radiation,
    means for dividing each pulse into two pulses, the first of said two pulses being polarized orthogonally to the second of said two pulses,
    means for varying the length of the path traversed by the second pulse with respect to said first pulse so as to provide an adjustable delay between said two beams,
    means for impinging said orthogonally polarized pulses onto said crystal surface so as to create a sum-frequency radiation generation of said two pulses at said surface, the signal strength of the sum-frequency generation being a function of the degree of coincidence of said two pulses, and
    detector means for measuring said sum-frequency signal strength.

References Cited

UNITED STATES PATENTS

| | | | |
|---|---|---|---|
| 3,290,504 | 12/1966 | Vallese et al. | 250—217 X |
| 3,293,438 | 12/1966 | Davis | 250—217 X |
| 3,326,078 | 6/1967 | Clarke et al. | 250—220 X |

RALPH G. NILSON, *Primary Examiner.*

T. N. GRIGSBY, *Assistant Examiner.*

U.S. Cl. X.R.

250—220, 225